US012055473B2

(12) United States Patent
McBrady et al.

(10) Patent No.: US 12,055,473 B2
(45) Date of Patent: Aug. 6, 2024

(54) NETWORK ASSISTED PARTICULATE MATTER SENSOR

(71) Applicant: Honeywell International Inc., Charlotte, NC (US)

(72) Inventors: Adam Dewey McBrady, Minneapolis, MN (US); Stephan Bork, Murphy, TX (US); Teresa Marta, White Bear Lake, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 684 days.

(21) Appl. No.: 17/249,054

(22) Filed: Feb. 18, 2021

(65) Prior Publication Data
US 2021/0247292 A1 Aug. 12, 2021

Related U.S. Application Data

(63) Continuation of application No. 16/210,964, filed on Dec. 5, 2018, now Pat. No. 10,928,295.
(Continued)

(51) Int. Cl.
G01N 15/0205 (2024.01)
G01N 15/06 (2024.01)
(Continued)

(52) U.S. Cl.
CPC ......... G01N 15/14 (2013.01); G01N 15/0205 (2013.01); G01N 15/06 (2013.01);
(Continued)

(58) Field of Classification Search
CPC ........... G01N 15/06; G01N 2015/0046; G01N 2015/1402
See application file for complete search history.

(56) References Cited

U.S. PATENT DOCUMENTS 9,425,627 B2 * 8/2016 Proud .................... H02J 50/12
9,726,579 B2    8/2017 Han et al.
(Continued)

FOREIGN PATENT DOCUMENTS

CN    104297117 A    1/2015
CN    105051463 A    11/2015
(Continued)

OTHER PUBLICATIONS

Office Action issued in Chinese Application No. 201811557705.8 on Jan. 20, 2021, 27 pages.
(Continued)

Primary Examiner — Manuel A Rivera Vargas
(74) Attorney, Agent, or Firm — Alston & Bird LLP

(57) ABSTRACT

Apparatus and associated methods relate to a particulate matter (PM) sensor assembly receiving a PM count value from an optical pulse counting sensor and selectively calibrating the sensor characteristics in response to recent published high-accuracy air-quality information within a local region that contains the sensor assembly. In an illustrative example, the air-quality information may be generated by various PM monitoring stations and published in data streams or collections, for example. The sensor assembly may select, for example, a specific regional PM mass density reference value from the received air-quality information associated with location information of the sensor assembly. Based on the published air-quality information, the sensor assembly may select a calibration curve from, for example, a set of predetermined calibration curves. A mobile low-cost PM sensor assembly, may advantageously leverage high-cost published PM air-quality information to dynamically improve accuracy in local PM measurement.

18 Claims, 3 Drawing Sheets

Related U.S. Application Data

(60) Provisional application No. 62/609,835, filed on Dec. 22, 2017.

(51) Int. Cl.
*G01N 15/14* (2006.01)
*G01N 15/00* (2006.01)

(52) U.S. Cl.
CPC .............. *G01N 2015/0046* (2013.01); *G01N 2015/1402* (2013.01)

(56) References Cited

U.S. PATENT DOCUMENTS

| | | | |
|---|---|---|---|
| 10,467,880 B2* | 11/2019 | Semanoukian | G01N 33/0031 |
| 2015/0077737 A1 | 3/2015 | Belinsky et al. | |
| 2016/0377430 A1 | 12/2016 | Kalagnanam et al. | |
| 2017/0243056 A1* | 8/2017 | Cheng | A63B 24/0059 |
| 2019/0195766 A1 | 6/2019 | Ryu | |

FOREIGN PATENT DOCUMENTS

| | | |
|---|---|---|
| CN | 105393292 A | 3/2016 |
| CN | 106251013 A | 12/2016 |
| CN | 106370570 A | 2/2017 |
| CN | 2544575 A | 5/2017 |
| CN | 106950334 A | 7/2017 |
| CN | 107014727 A | 8/2017 |
| CN | 107063995 A | 8/2017 |
| WO | 2017/192185 A1 | 11/2017 |
| WO | 2017/213918 A1 | 12/2017 |

OTHER PUBLICATIONS

U.S. Appl. No. 16/210,964, filed, U.S. Pat. No. 10,928,295, Patented.
DE Office Action Mailed on Apr. 1, 2022 for DE Application No. 102018133258.
Notice to Grant Patent Right for Invention issued in Chinese Application No. 201811557705.8 on Mar. 16, 2022, 4 pages.
Office Action issued in Chinese Application No. 201811557705.8 on Dec. 22, 2021, 7 pages.
Office Action issued in Chinese Application No. 201811557705.8 on Aug. 3, 2021, 19 pages.
Honeywell, HPM Series: Particle Sensor, 2018 [online], [retrieved on Dec. 4, 2018]. Retrieved from the Internet <https://sensing.honeywell.com/honeywell-sensing-hpm-series-particle-sensors-datasheet-32322550-e-en.pdf>.
Notice of Allowance and Fees Due (PTOL-85) Mailed on Oct. 26, 2020 for U.S. Appl. No. 16/210,964.

* cited by examiner

NETWORK ASSISTED PARTICULATE MATTER SENSOR

CROSS-REFERENCE TO RELATED APPLICATIONS

This application is a continuation of U.S. Non-Provisional patent application Ser. No. 16/210,964, filed on Dec. 5, 2018 and entitled "Network Assisted Particulate Matter Sensor," which claims priority to and the benefit of U.S. Provisional Application No. 62/609,835, filed on Dec. 22, 2017 and entitled "Network Assisted Particulate Matter Sensor," each of which is incorporated herein by reference in its entirety.

TECHNICAL FIELD

Various embodiments relate generally to sensing particulate matter.

BACKGROUND

Awareness of air-quality and health issues related to air-quality is rapidly growing. Air-quality may be measured by detecting the mass of particulate matter (PM) in a specified volume. Some particulate matter may penetrate the gas exchange region of a human lung, and may therefore make its way into the bloodstream. The smaller the particulate matter, the greater the risk of penetration into the bloodstream, and therefore the greater the risk of health issues.

Concerned organizations, for example, government agencies, are therefore deploying air-quality monitoring stations in various parts of the world. The stations may be deployed to monitor and measure airborne particulate matter. Data from these stations is routinely published on the Internet. Some of the data may be a measure of particle mass density and may be measured in mass per unit volume. For example, the PM 2.5 index is a measure of particulate matter that is smaller than 2.5 microns in diameter, in micrograms per cubic meter.

All particulate matter groups have a size distribution. For example, smoke from an exemplary Chinese cigarette may be distributed about a particle size of 0.1 µm. Pollen size distributions may generally fall between about 5 µm and about 75 µm. Further, size distribution of PM may be dependent on location, time of day, and many other local environmental conditions.

SUMMARY

Apparatus and associated methods relate to a particulate matter (PM) sensor assembly receiving a PM count value from an optical scattering sensor and selectively calibrating the sensor characteristics in response to recent published high-accuracy air-quality information within a local region that contains the sensor assembly. In an illustrative example, the air-quality information may be generated by various PM monitoring stations and published in data streams or collections, for example. The sensor assembly may select, for example, a specific regional PM mass density reference value from the received air-quality information associated with location information of the sensor assembly. Based on the published air-quality information, the sensor assembly may select a calibration curve from, for example, a set of predetermined calibration curves. A mobile low-cost PM sensor assembly, may advantageously leverage high-cost published PM air-quality information to dynamically improve accuracy in local PM measurement.

Various embodiments may achieve one or more advantages. For example, some embodiments may determine various particulate matter indexes (e.g., PM 2.5, PM 10) cost-effectively and with high accuracy. Calibration and firmware of various examples may be updated in the field, and may be updated on a continual basis. Some examples may approximate particular sources of PM pollution (e.g., pollen count). Various examples may be an Internet-updatable sensor and may be compatible with the Internet of things (IoT) and the social Internet of things (SIoT).

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
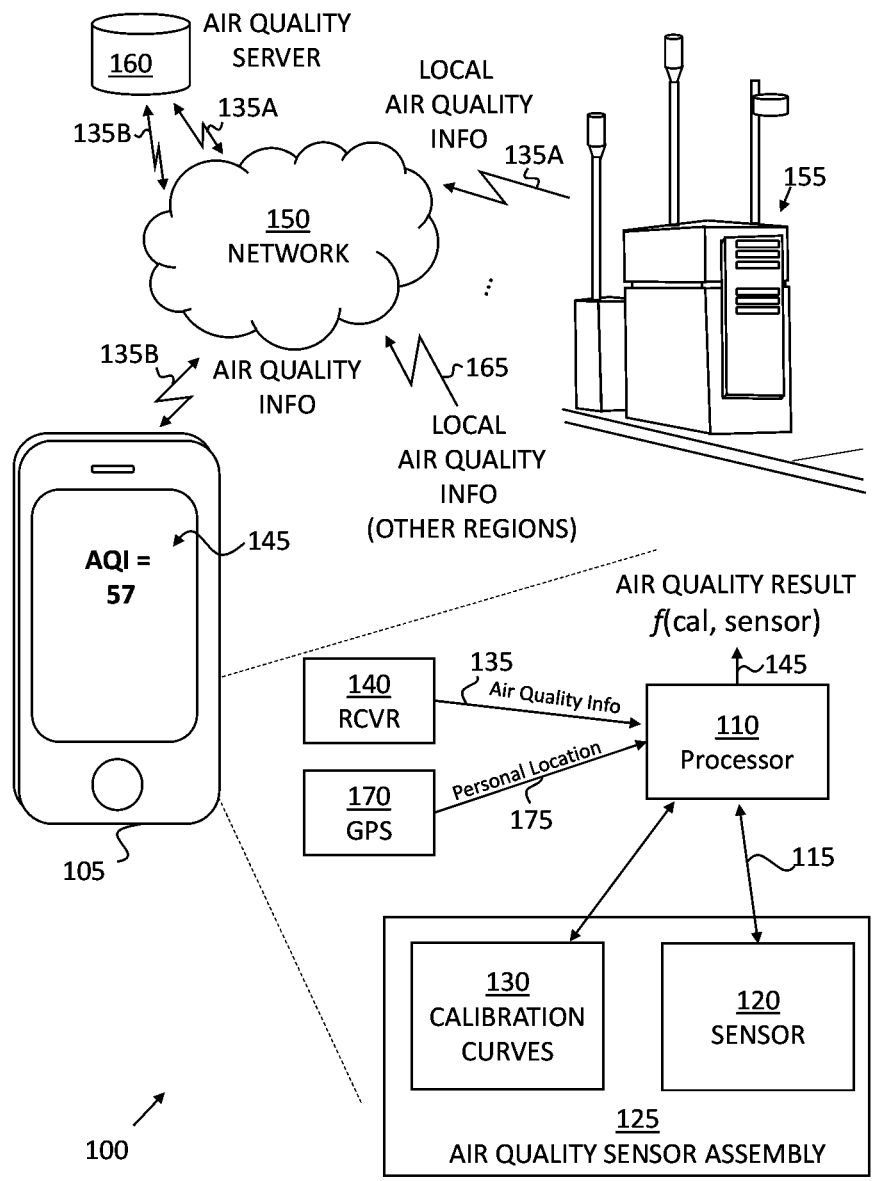
FIG. 1 depicts an exemplary Internet-assisted air-quality sensor system in an illustrative use-case scenario.

To aid understanding, this document is organized as follows. First, an exemplary Internet assisted particulate matter (PM) sensing system is briefly introduced with reference to FIG. 1. Next, with reference to FIG. 2, the discussion turns to exemplary embodiments that illustrate operational details. Finally, FIG. 3 presents an exemplary set of calibration curves, one of which is automatically chosen based on correlation with an institutional PM reference standard.

Many lower-cost particulate matter sensors may be based on the principle of optical scattering, sometimes called nephelometry. An air sample containing particles is brought through a detection zone where light from an interrogating beam is scattered by the particles. The scattered light is received by a photodetector while the particle is in the detection zone. In pulse counting sensors, the resulting increase and decrease in photodetector signal as the particle enters and exist the detection zone is referred to as the optical pulse. These pulses are recorded and serve as the raw data source for measuring the mass density of particulate matter (PM). During a typical factory calibration, a known mass density of particulate matter is generated and is used to calibrate each sensor. Each sensor records the optical pulses per unit time. These calibrations mathematically correlate the optical pulses per unit time to a known PM concentration. This calibration process embeds certain assumptions about the particulate matter into the deployed sensor. If the real-world particulate matter has the same size distribution, shape distribution, chemical makeup, and optical properties as the particulate matter used during calibration, the assumptions are largely correct. However, when any of these (and more) properties of the real-world particulate matter are different than those of the particulate matter used in the calibration, then the assumptions are incorrect and may results in erroneous mass density readings.

In at least one exemplary aspect, the calibrated optical pulse counting PM sensor may use a total number of pulses per unit time, which may be calibrated against cigarette smoke (having a vast majority of mass is from particles less than 1.0 μm in diameter). This PM sensor may be deployed into the desert southwest, for example (where typical real-world particulate matter has the majority of mass from particles greater than 1.0 μm). In this locally deployed environment, the factory calibration with cigarette smoke may result in reporting PM mass densities erroneously low (due to the vast difference in mass of particles of cigarette smoke versus mass of particles in the desert southwest). Accordingly, various embodiments may include apparatuses and methods for the sensor to receive information about its local environment (e.g. GPS location, reported PM 2.5 data from a local EPA station, etc.), and adjust its calibration coefficients or switch to a separate calibration (curve) that is more appropriate for particulate matter with larger diameters. The information about the local environment of the PM sensor may include at least the following three types of data: (1) direct data about the particulate matter size distribution (e.g. PM2.5 data alone, a combination of PM2.5, PM10, PM1, or a ratio of PM2.5, PM10, PM1), (2) additional air quality data that does not directly contain particulate matter info (e.g. humidity, temperature, atmospheric pressure, precipitation, etc.), or (3) tangential information (e.g. GPS data, whether a car wiper is turned on, whether a car is off-road, optical information, such as pictures of a surrounding environment, etc.).

Methods and apparatuses described herein may make use of 3 different types of data to improve the calibration of deployed PM sensors for their local environment. The three categories differ in how directly the received information relates to the local particulate matter in the deployed sensor's location. As discussed above, the three categories are: (1) direct data about the particulate matter size distribution (e.g. location specific PM2.5 data alone, or a combo of PM2.5, PM10, PM1); (2) additional air quality data that does not directly contain particulate matter info (e.g. humidity, temperature, atmospheric pressure, whether it is raining, etc.); and (3) tangential information (e.g. GPS data, whether a car wiper is on, whether a car is off-road, optical information (pictures) of surrounding environment). An example embodiment of the calibration adjustment for each of three types of data is provided below. Certain embodiments may make use of combination of the three data categories.

For category 1, the deployed sensor would receive locally published PM 2.5 information, for example, from its location in the desert southwest, and compare the received data to the PM2.5 reading the sensor produces based on the factory calibration using cigarette smoke. When the difference between the two readings exceeds a threshold, the sensor could switch to a calibration that results in the sensor's data more closely matching the locally published value. In some embodiments, this could be accomplished by moving from calibration curve 325 to calibration curve 305 (see FIG. 3).

For category 2, the deployed sensor receives air quality information that does not directly contain particulate matter information. In some embodiments, the air quality data could be the local humidity. In high humidity environments, particulate matter can adsorb water molecules, which can have a tendency to increase the scattering area of the particle without increasing the solid-mass of particulate. As a result of smaller particles presenting a larger surface area (and therefore exceeding the noise floor of a typical optical pulse counting PM sensor), high humidity environments can increase the number of optical pulses recorded for a given concentration and size distribution of airborne particulates and may result in erroneously large PM measurements. In some examples, the PM sensor receiving large humidity values for the deployed environment may adjust its calibration to produce lower PM readings.

For category 3, the deployed sensor may receive tangential information that is indirectly related to the typical particulate matter in the deployed environment. In an exemplary scenario, the sensor may receive location information that identifies its deployed environment as outdoors in the desert southwest of the US. In this environment, the airborne particulate matter may be dominated by particles of size greater than 1.0 μm. In some embodiments, the deployed sensor may adjust its calibration from calibration curve 325 to calibration curve 305 (FIG. 3) in anticipation that each optical pulse recorded will represent a larger mass than the optical pulses recorded from the cigarette smoke calibration in the factory.

FIG. 1 depicts an exemplary Internet-assisted air-quality sensor system in an illustrative use-case scenario. A use-case scenario 100 includes a mobile PM sensor system 105. The mobile PM sensor system 105 may be a personal mobile device (e.g., phone, tablet, PM sensor) executing a mobile application (app). The mobile PM sensor system 105 is executing an air-quality application within a processor 110. The processor 110 receives sensor data 115 from a sensor 120. The sensor 120 is included within an air-quality sensor assembly 125. The air-quality sensor assembly 125 includes information defining a set of calibration curves 130, which may be stored in non-volatile memory. The processor 110 also receives a signal containing local air-quality information 135 via an onboard receiver 140. The processor 110 executes a program of instructions to select a calibration curve from the set of calibration curves 130. The selected one of the calibration curves may be based on the air-quality information 135, for example, to a calibration function with a maximum correlation (e.g., minimum error) to the ambient air quality in that region. Finally, the processor 110 determines a particulate matter concentration value 145 from processing data from the sensor 120 with the selected calibration curve from the set of calibration curves 130. The determined particulate matter concentration value 145 is displayed to a user on the mobile PM sensor system 105. Accordingly, the mobile PM sensor system 105, assisted by the air-quality information 135, the sensor 120, and the set of calibration curves 130, may determine reliable air-quality values. The particulate matter concentration value 145 may be an air-quality result, which may be a function of the best calibration curve from the set of calibration curves 130 and a value from the sensor 120. Various embodiments may advantageously leverage published air-quality information to assist in the calibration of the cost-effective PM sensor system 105 in real-time.

The local air-quality information 135 is received by the mobile PM sensor system 105 via a network 150 (e.g., Internet). The air-quality information 135 originates from a local area air-quality monitor 155. The local area air-quality monitor 155 generates a signal containing local air-quality information 135A. The local air-quality information 135A is transmitted to the network 150. An air-quality server 160 on the network 150 receives the local air-quality information 135A. The air-quality server 160 may process and format the local air-quality information 135A. Further, the air-quality server 160 publishes local air-quality information 135B. The published local air-quality information 135B is received by the mobile PM sensor system 105 via the network 150. The receiver 140, within the mobile PM sensor system 105, sends the air-quality information 135 to the processor 110.

The mobile PM sensor system 105 receives air-quality information from multiple regions 165. A global positioning system (GPS) 170 provides a personal location 175 to the processor 110. The processor 110 executes a program of instructions to select the appropriate regionally-specific air-quality information based on the personal location 175.

Figure 2:
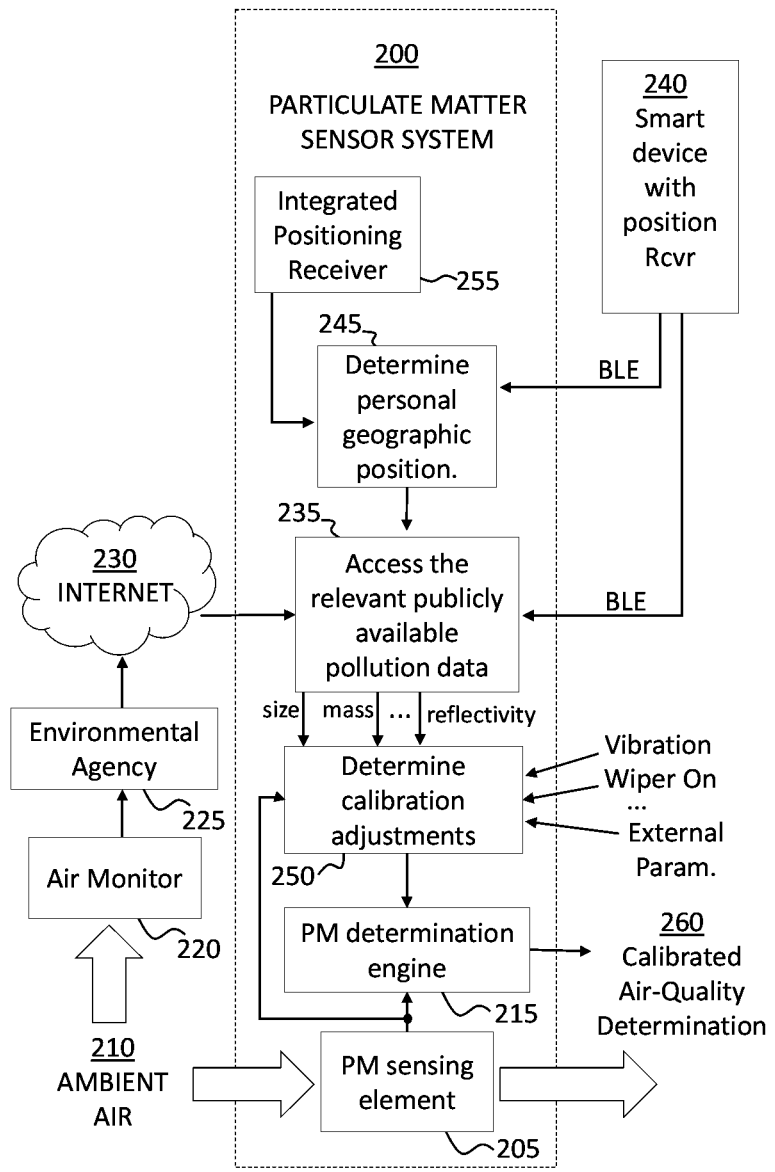
FIG. 2 depicts a process flow diagram of an exemplary network-assisted particulate matter sensor.
Figure 3:
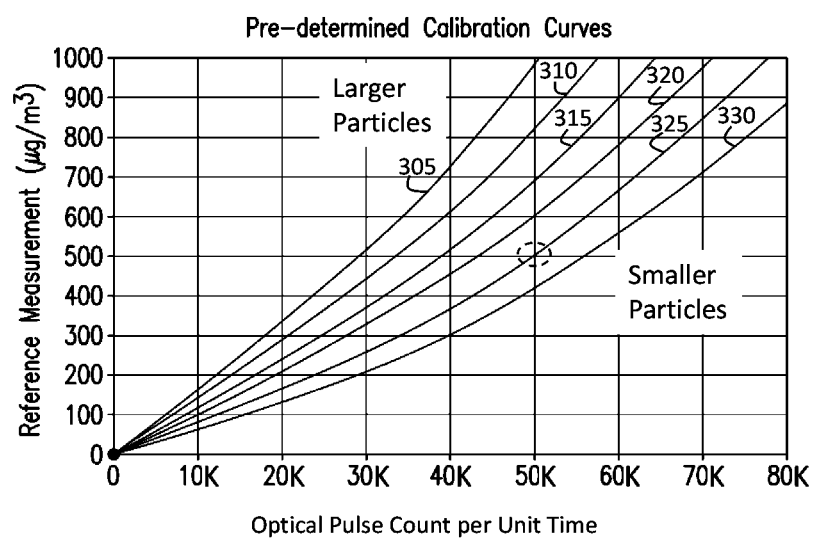
FIG. 3 depicts a chart view of a set of exemplary calibration curves included in an assisted particulate matter sensor.

FIG. 2 depicts a process flow diagram of an exemplary network-assisted particulate matter sensor. A particulate matter sensor system (PMSS) 200 includes a PM sensing element 205. The PM sensing element 205 receives a sample of ambient air 210. The PM sensing element 205 may be an optical pulse counting sensor, for example. The PM sensing element 205 produces a pulse count reading and sends that reading to a PM determination engine 215.

Various examples of PM sensing elements 205 may include sensing techniques beneficial in detecting large particulate matter, other PM sensing elements 205 may include sensing techniques beneficial in detecting small particulate matter. In some examples, the PM sensing element 205 may be implemented as a photometric sensor. In various implementations, the PM sensing element 205 may employ a combination of photometric and pulse counting techniques, for example. Accordingly, the PM sensing element 205 may include one or more other types of sensing elements, alone or combination.

In some examples, the PM sensing element 205 may be implemented as gravimetric, resonator or flow based. Accordingly, various types of PM sensing elements 205 may benefit, for example, from assistance data. The assistance data may include local ambient humidity, for example. Local ambient humidity may be absorbed by particulate matter, increasing the mass of the particles. The PMSS 200 may compensate for this effect by choosing a heavier PM calibration curve, for example, when the humidity is higher.

A regional air-quality monitor 220 gathers a sample of the ambient air 210 in the same local geographical region as the PM sensing element 205. The regional air-quality monitor 220 may generate various air-quality parameters and indices. The various air-quality parameters and indices are sent to an environmental agency 225. The environmental agency 225 may be included within a group of various organizations concerned with air-quality and/or public health. The various air-quality parameters and indices gathered from the regional air-quality monitor 220 may be combined with the data from multiple regional air-quality monitors 220, and may be sent to the environmental agency 225. The environmental agency 225 may produce information relating to the data gathered by the regional air-quality monitors 220. The information may be published on various public networks. In some examples, the information may be published on the Internet 230.

In various embodiments, the PMSS 200 may access relevant publicly available air-quality information (e.g., pollution data) in a module 235, directly from the Internet 230. In some examples, the PMSS 200 may access relevant publicly available air-quality information in module 235 indirectly through a communication link to a smart device 240. In the depicted example, module 235 couples to the smart device 240 via Bluetooth low energy (BLE). In some examples, the coupling may be via near-field communication (NFC) or radio-frequency identification (RFID). In some examples, the coupling may be hardwired.

Module 235 also receives information regarding the personal geographic position of the PMSS 200 via a module 245. In response to receiving the local area of the PMSS 200, and the relevant publicly available air-quality information, module 235 produces various parametric data, for example, particle size distribution, particle mass, and particle reflectivity relevant to the local area of the PMSS 200. In some examples, the air-quality information may be received from publicly available air-quality stations or from private high-quality air monitor stations.

The parametric outputs of module 235 are input to a module 250, the calibration determination module. In module 250, the PMSS 200 determines system calibration adjustments. For example, in some embodiments, a family of predetermined calibration curves may be stored within the PMSS 200. Each of the curves in the family of curves may define a transfer function that translates particle counts to particulate matter mass density. In various embodiments, each of the curves may be associated with a specific range of particle sizes. Accordingly, the determination of calibration adjustments module 250 may select one of the curves in the family of curves, based on size distribution, for example.

In various embodiments, each of the curves may be associated with a range of particle reflectivity, particle color, particle roughness, and/or particle chemical makeup, for example. In each parametric instance, module 250 may choose the curve associated with the parameter value received from module 235, which is a particular datum contained within the pollution information from the publicly available air-quality information. Once the curve is supplied to the PM determination engine 215 along with the sensed particle count from the PM sensing element 205, a PM air-quality value 260 may be determined.

In some implementations, the calibration curve may be selected by receiving the mass density from the pollution data from the publicly available air-quality information. In such implementations, the calibration adjustments determination module 250 may compare the mass density of each curve evaluated at the sensor's current average particle count. The curve resulting in the mass density closest to the published data for the current average particle count may be chosen as the active calibration curve.

In some embodiments, a family of predetermined calibration coefficients may be stored within the PMSS 200. Each set of coefficients may define a curve, which may define a transfer function that translates particle counts to particulate matter mass density. As in the example using a family of curves, each set of coefficients may be associated with a specific range of one or more of the parameters from module 235. The coefficients may be polynomial coefficients, for example.

In various embodiments, one or more parameters may be employed to determine calibration adjustments. Some of these parameters may factor into a determination of which calibration curve to select or which set of polynomial coefficients to use. Some of these parameters may provide adjustments to the curves and/or the coefficients.

The various additional parameters may include road vibration. Road vibration may be an indication of a construction area, which may include larger particles, increasing the size distribution on particulate matter in the vicinity. Increased road vibration may cause the calibration adjustments within the PMSS 200 to be biased more toward the larger particle size, for example. In some examples, the PMSS 200 may receive road condition parameters from an electronic map in combination with a GPS receiver. For example, the electronic map may transmit a signal including road parameters such as paved, unpaved, or off-road.

Various additional parameters may include a "wiper on" signal, in a vehicle, for example. The "wiper on" signal may provide information about humidity. For example, since the wipers may be active when rain is present, the ambient air may be saturated with moisture. Accordingly, in various implementations, the PMSS 200 may process the "wiper on" signal as it would a humidity signal received from, for example, published humidity data from a network. In some examples, the "wiper on" signal may be an indication of particles being washed away from the vicinity. The "wiper on" signal may cause the adjustments within the PMSS 200 to be in a lower and/or in a finer resolution range, for example.

Accordingly, various additional parameters by way of example, and not limitation, including temperature, time of day, wind speed, altitude, and barometer may each have a unique effect on particulate matter and therefore an effect on PM parameters. Accordingly, each of the various additional parameters may affect the calibration adjustments.

In some examples, the PMSS 200 may choose one of a family of calibration curves. In some embodiments, the calibration adjustments determination module 250 may use one of the curves as a starting point then make adjustments based on one or more of the various additional parameters.

In module 245, the PMSS 200 determines its personal geographical position. In the depicted example, this may be accomplished via an integrated positioning receiver 255 (e.g., GPS) or may be accomplished via an external smart device (e.g., 240) containing a positioning receiver. In the depicted example, module 245 couples to the smart device 240 via Bluetooth low energy (BLE). The integrated positioning receiver 255 may be an implementation of an open database of cell towers, which may be a cost-effective non-GPS positioning system. The smart device (e.g., 240) may also employ an implementation of an open database of cell towers.

The PM determination engine 215 inputs the final determination of calibration adjustments (module 250), and the reading from the PM sensing element 205 to determine the air-quality value 260.

FIG. 3 depicts a chart view of a set of exemplary calibration curves included in an assisted particulate matter sensor. A set of predetermined calibration curves 300 includes curves 305, 310, 315, 320, 325, and 330. Each of the curves 305-330 represents a transfer function between a raw sensor reading and a calibrated output mass density value. The curves 305-330 may be stored in a nonvolatile memory (e.g., FIG. 1, item 130) within an air-quality sensor assembly, such as the air-quality sensor assembly 125. In some examples, the curves 300 may be generated experimentally, each curve 305-330 representing a transfer function between a raw sensor reading (e.g., in particles per cubic meter) and a mass density (e.g., in micrograms per cubic meter) for a given particle size distribution of a given air sample.

In an illustrative example, a PM sensing element, such as the PM sensing element 205, may read 50,000 particles per cubic meter in a given geographic region. According to published air-quality data from an environmental agency, such as the environmental agency 225, acquired from a public website, a regional air-quality monitor, such as the regional air-quality monitor 220, monitoring ambient air, such as the ambient air 210, in the vicinity, the mass density of particulate matter may be, for example, 500 µg/m³. In response to the sensor reading and the air-quality data from the regional air-quality monitor, a PMSS, such as the PMSS 200, may choose curve 325, as depicted in FIG. 3. Accordingly, various embodiments may advantageously leverage published air-quality information to dynamically calibrate a cost-effective PM sensing element in real-time.

In some embodiments, a PM sensor system may compare its own particulate matter results to an average of the locally published regional results for the current day, for example. The PM sensor system may determine that its PM concentrations are higher than the published average air-quality data for the same region. In some instances, the PM sensor system may determine that its PM concentrations are lower than the published average air-quality data for the same region. Further, the sensor system may determine the time duration of the high/low concentration comparisons. These comparisons may take place in real-time, triggering a recalibration when the difference exceeds a predetermined threshold. Recalibrations may occur as the particle size distribution within a region changes. Accordingly, some examples of PM sensor systems may choose an appropriate calibration curve based on a best-fit correlation with current and regionally published air-quality (particulate matter) data.

For example, a region may, for a period of time, experience a small particle size distribution average of 0.5 µm (e.g., smoke, sulfuric acid) due to significant industrial activity that is upwind. As a result, the particle sensor system may be calibrated for the low mass of such particles (e.g., calibration curve 330). At some point in time, prevailing winds may shift, and the same region may experience a larger particle size distribution average of 5.0 µm (e.g., cement dust, asphalt) now due to a construction site that is upwind. Because the particle sensor system had been previously calibrated for low mass particles (e.g., calibration curve 330), an equivalent particle count of larger particles may result in a mass density that is too small. Accordingly, the particle sensor system may receive mas density data from local air-quality measurement systems via the Internet, for example, that is higher than what the particle sensor system in this example is reporting. In response, the particle sensor system may trigger an internal recalibration process, resulting in use of a different calibration curve (e.g., calibration curve 305) to estimate the mass density of the new particle size distribution.

Each of the curves 305-330 may be stored in a nonvolatile memory (e.g., FIG. 1, item 130) within an air-quality sensor assembly (e.g., 125). The curves may be stored as data points in an array, which may advantageously provide increasingly higher precision, as points are added to the array. In some implementations, the curves may be stored as polynomial coefficients, which may be memory-efficient and may inherently provide interpolated results.

Although various embodiments have been described with reference to the figures, other embodiments are possible. For example, in some instances, the firmware and/or calibration data of a PM sensing system may be updated using various methods. The methods may vary depending on, for example, the transduction principles of the sensor, the fidelity of the publicly available air-quality information, and the desired type of improvement to the sensor accuracy.

In some embodiments, a PM sensing system may access publicly available data on particulate matter pollution sources (e.g., PM size distribution, pollen content, chemical make-up of particulate) for a region that the PM sensor system is deployed. The PM sensing system may use the publicly available data to update its calibration constants, to choose a calibration curve (from a set of curves saved in manufacturing), and/or to update firmware, in order to display more accurate and precise readings of the local PM pollution in an area (e.g., geographical outdoor location, room, car).

In some implementations, a PM sensing system may provide various communication links. For example, particulate matter information may be received by the PM sensing system via an Internet connection. The Internet connection may be hardwired to the system or may be wireless. In some embodiments, a separate Internet connected device (e.g., laptop, mobile phone, tablet, desktop computer) may obtain Internet-specific data and relay the data to the PM sensing system. In some examples, the PM sensing system may contain a GPS receiver. The data from the GPS receiver may aid an on-board processor in determining the most appropriate local particulate matter station in which to compare the data.

In various embodiments, a PM sensor system may be implemented within a smart thermostat, such as thermostats which include a processor executing preprogrammed instructions. In some implementations, a PM sensor system may be part of a Software as a Service (SaaS) solution. Further, the PM sensor system may cover infrastructure enabling connected devices. Various PM sensing systems may manipulate data to gain information (e.g., trending, predictive analytics, Big Data).

In some embodiments, a PM sensing system may initiate an update to its calibration only when paired with a mobile device. In such embodiments, the mobile device may access publicly available air-quality information and send that information to the PM sensor system via a communication channel (e.g., BLE, NFC, RF).

In some embodiments, information from various network coupled environmental sensors may benefit from received signals which include network environmental information. For example, a gas sensor system may receive a signal from a network containing humidity information. The gas sensor system may combine the humidity information with the gas sensing information in a predetermined function. The combination of the humidity information and the gas information may advantageously produce a more accurate result than the gas sensor information alone, for example. In some examples, humidity information may combine with temperature information to produce a more accurate temperature result and/or to produce a heat index value. In various implementations, barometric pressure may combine with, for example, time of day information, and/or wind speed information, the information received from network connection signals. Accordingly, wind speed information may be published from local doppler radar equipped agencies and may combine with various environmental sensor information to produce more accurate results. Further, in various implementations, environmental parameters received from published sources on a network (e.g., wind speed, wind direction, location) may be combined with a signal from an environmental sensing element to produce a resulting environmental parametric value that is more accurate than the resulting signal from the environmental sensing element alone.

In some examples, a PM sensor system may receive a signal containing aerial pictures from satellites and/or drones. The PM sensor system may combine the aerial pictures with the PM sensing information to produce a more accurate PM value. In an illustrative example, a sand storm captured visually by an overhead drone may send a signal to a network with intensity data and location data. A network assisted PM sensor system may receive the signal with the intensity and location data of the sand storm and may combine the data with a predetermined function to produce a more accurate mass density value of particulate matter in the location of the sand storm.

In one exemplary aspect, an apparatus may estimate a measure of an amount of a substance mixed in a gaseous fluid. The apparatus may include a particulate matter (PM) sensor adapted to sample ambient air and to generate a local measurement data signal in response to measurement of the sampled ambient air, and a processor operatively coupled to the PM sensor to receive the local measurement data signal. A first data store may be operatively coupled to the processor and containing a plurality of predetermined calibration curves associated with the PM sensor, each of the plurality of calibration curves defining a calibration function to substantially compensate for non-idealities in accuracy of the local measurement data signal around a operating point of parametric conditions applicable while the ambient air being sampled by the PM sensor. The apparatus may also include a receiving module operatively coupled to the processor and configured to receive a published reference information signal indicative of air quality at a reference air quality sensing station in a geographic region that contains the PM sensor and the reference air quality sensing station, and a second data store operatively coupled to the processor and containing a program of instructions that, when executed by the processor, cause the processor to perform operations to automatically calibrate the local measurement data signal in response to the published reference information signal. The operations may include: (i) determine, from the received published reference information signal, an estimated operating point of the parametric conditions applicable while the ambient air being sampled by the PM sensor; (ii) select one of the plurality of predetermined calibration curves based on the determined operating point; and, (iii) generate, for display on a display device, an air quality metric signal using the selected predetermined calibration curve applied to the local measurement data signal.

In some embodiments, the PM sensor may include an optical pulse counting sensing element, a gravimetric sensing element, a resonator based sensing element, or a flow-based sensing element. The PM sensor may be portable, and may be operably coupled to a handheld mobile communication device, wherein the receiving module is formed in the handheld mobile communication device.

The apparatus may further include a location determination module operatively coupled to provide, to the processor, information about the geographical position of the PM sensor. The operations further may include: (iv) receive, with the receiving module, information about at least one additional air quality sensing station; and, (v) select, from among the reference air quality sensing station and the at least one additional air quality sensing station, one of the reference air quality sensing stations in a geographic region that contains the PM sensor and the reference air quality sensing station.

The parametric conditions applicable while the ambient air being sampled by the PM sensor may include humidity of the ambient air being sampled.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A method of updating a current firmware of a particulate matter (PM) sensor, the method comprising:
   receiving, by a processor, air-quality information of a local geographic region associated with the PM sensor, wherein the air-quality information is sampled by the PM sensor;
   receiving, by the processor, a published reference information indicative of air quality at a reference air quality sensing station in the local geographic region associated with the PM sensor;
   determining, by the processor, based on the received published reference information, an estimated operating point of parametric conditions applicable for ambient air sampled by the PM sensor;
   selecting, by the processor, one of a plurality of predetermined calibrations for the PM sensor based on the estimated operating point;

determining, by the processor, an updated firmware of the PM sensor based at least in part on the selected predetermined calibration; and replacing, by the processor, the current firmware of the PM sensor with the updated firmware of the PM sensor.

2. The method of claim 1, wherein, prior to receiving the air-quality information, the method further comprises:

querying, by the processor, a reference data source to request the air-quality information of the local geographic region.

3. The method of claim 1, wherein the air-quality information of the local geographic region comprises particulate matter size distribution information.

4. The method of claim 1, wherein the air-quality information of the local geographic region comprises at least one of pollen content information or particulate chemical make-up information.

5. The method of claim 1 further comprising:

receiving, by the processor, at least one of global positioning satellite (GPS) location information, windshield wiper on information, or off-road driving information.

6. The method of claim 1 further comprising:

determining, by the processor, a sensor parameter associated with the PM sensor.

7. A firmware updating system for a particulate matter (PM) sensor comprising a processor and a non-transitory memory comprising processor executable program instructions, the non-transitory memory and the processor executable program instructions configured to, with the processor, cause the firmware updating system to:

receive air-quality information of a local geographic region associated with the PM sensor, wherein the air-quality information is sampled by the PM sensor;

receiving, by the processor, a published reference information indicative of air quality at a reference air quality sensing station in the local geographic region associated with the PM sensor;

determining, by the processor, based on the received published reference information, an estimated operating point of parametric conditions applicable for ambient air sampled by the PM sensor;

selecting, by the processor, one of a plurality of predetermined calibrations for the PM sensor based on the estimated operating point;

determine an updated firmware of the PM sensor based at least in part on the selected predetermined calibration; and replace a current firmware of the PM sensor with the updated firmware of the PM sensor.

8. The firmware updating system of claim 7, wherein, prior to receiving the air-quality information, the non-transitory memory and the processor executable program instructions are configured to, with the processor, cause the firmware updating system to:

query a reference data source to request the air-quality information of the local geographic region.

9. The firmware updating system of claim 7, wherein the air-quality information of the local geographic region comprises particulate matter size distribution information.

10. The firmware updating system of claim 7, wherein the air-quality information of the local geographic region comprises at least one of pollen content information or particulate chemical make-up information.

11. The firmware updating system of claim 7, wherein the non-transitory memory and the processor executable program instructions are configured to, with the processor, cause the firmware updating system to:

receive at least one of global positioning satellite (GPS) location information, windshield wiper on information, or off-road driving information.

12. The firmware updating system of claim 7, wherein the non-transitory memory and the processor executable program instructions are configured to, with the processor, cause the firmware updating system to:

determine a sensor parameter associated with the PM sensor.

13. A non-transitory computer program product for updating a current firmware of a particulate matter (PM) sensor, the non-transitory computer program product comprising a non-transitory machine-readable storage device having processor executable program instructions stored therein, the processor executable program instructions configured to:

receive air-quality information of a local geographic region associated with the PM sensor, wherein the air-quality information is sampled by the PM sensor;

receive a published reference information indicative of air quality at a reference air quality sensing station in the local geographic region associated with the PM sensor;

determine, based on the received published reference information, an estimated operating point of parametric conditions applicable for ambient air sampled by the PM sensor;

select one of a plurality of predetermined calibrations for the PM sensor based on the estimated operating point;

determine an updated firmware of the PM sensor based at least in part on the selected predetermined calibration; and replace the current firmware of the PM sensor with the updated firmware of the PM sensor.

14. The non-transitory computer program product of claim 13, wherein, prior to receiving the air-quality information, the processor executable program instructions are configured to:

query a reference data source to request the air-quality information of the local geographic region.

15. The non-transitory computer program product of claim 13, wherein the air-quality information of the local geographic region comprises particulate matter size distribution information.

16. The non-transitory computer program product of claim 13, wherein the air-quality information of the local geographic region comprises at least one of pollen content information or particulate chemical make-up information.

17. The non-transitory computer program product of claim 13, wherein the processor executable program instructions are configured to:

receive at least one of global positioning satellite (GPS) location information, windshield wiper on information, or off-road driving information.

18. The non-transitory computer program product of claim 13, wherein the processor executable program instructions configured to:

determine a sensor parameter associated with the PM sensor.

* * * * *